(No Model.)

T. LUMSDON.
HILLSIDE PLOW.

No. 392,566. Patented Nov. 6, 1888.

Witnesses.
Edm. P. Ellis
L. L. Burket

Inventor.
Thos. Lumsdon,
per
F. A. Lehmann,
Atty.

UNITED STATES PATENT OFFICE.

THOMAS LUMSDON, OF MARION, VIRGINIA.

HILLSIDE-PLOW.

SPECIFICATION forming part of Letters Patent No. 392,566, dated November 6, 1888.

Application filed July 31, 1888. Serial No. 281,533. (No model.)

*To all whom it may concern:*

Be it known that I, THOMAS LUMSDON, of Marion, in the county of Smyth and State of Virginia, have invented certain new and useful Improvements in Hillside-Plows; and I do hereby declare the following to be a full, clear, and exact description of the invention, such as will enable others skilled in the art to which it pertains to make and use it, reference being had to the accompanying drawings, which form part of this specification.

My invention relates to an improvement in hillside-plows; and it consists in the combination of the beam, standard, and reversible mold-board with a flexible connection—such as a cord, wire, or chain—a guide upon the rear end of the beam, a swivel or nut placed upon the hook, a lever pivoted to one of the handles, and a stop or catch secured to the cross-bar which unites the handles together, as will be more fully described hereinafter.

The object of my invention is to provide an operating-lever, which is connected to the reversible mold-board by means of a flexible connection in such a manner that the mold-board can be quickly and easily reversed at the will of the operator.

Figure 1:
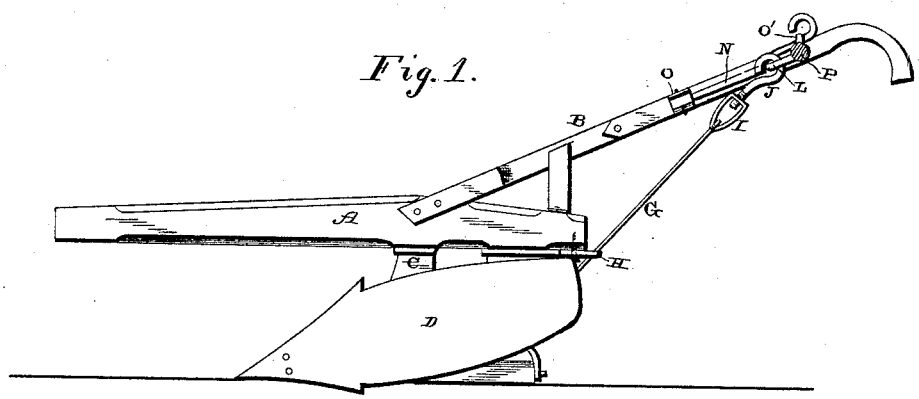
Figure 2:
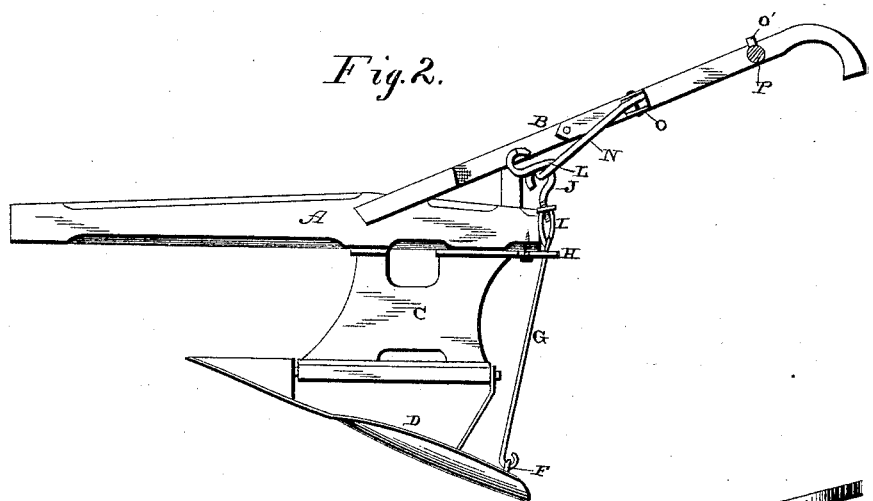
Figure 3:
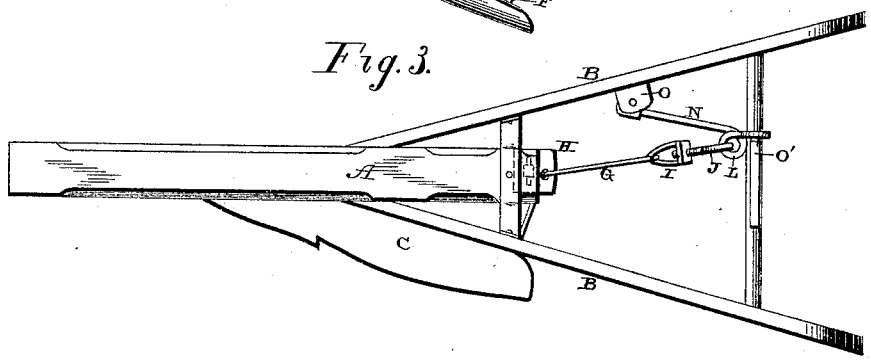

Figure 1 is a side elevation of a plow which embodies my invention, the mold-board being shown in position. Fig. 2 is a similar view showing the mold-board dropped down and in the act of being reversed. Fig. 3 is a plan view.

A represents the beam; B, the handles; C, the standard, and D the reversible mold-board, which is attached to the standard in the usual manner. Secured to the inner side of the rear end of the mold-board is an eye or hook, F, to which the lower end of the cord, wire, chain, or cable G is fastened. This wire, cord, or cable passes up through a suitable adjustable guide, H, which is secured to the rear end of the beam, and is fastened at its upper end to an adjusting nut or swivel, I, which is screwed upon the lower end of the hook J. A nut or swivel is used for making connection with the hook, so as to adjust the wire, cord, or cable to just the length necessary in case it should by wear become elongated or stretched by heat or from any other cause. The hook is fastened to a loop, L, which is formed in the lever N, which is pivoted to a suitable bracket or pivot, O, which is fastened to the inner side of one of the handles. The lever, when the mold-board drops down into the position shown in Fig. 2, has its lower end to extend down toward the end of the beam; but when the mold-board is raised upward and locked in position this lever has its upper end to catch behind a projection, O', formed upon the cross-bar P, which unites the two handles together.

When the end of the furrow is reached, the operator has but to release the end of the lever from the catch on the cross-bar, and when the plow is raised the mold-board drops from its own gravity into the position shown in Fig. 2. The operator by catching hold of the lever can instantly draw the mold-board up into position upon the opposite side of the standard, and lock it in that position by having the end of the lever catch behind the projection. This lever and connecting cord, wire, or cable enables the operator to quickly reverse the mold-board and lock it in position, instead of having to reverse it in the usual manner, which requires considerable time and exertion; but a very slight pull is necessary to raise the mold-board from the vertical position in which it hangs when the plow is raised into an operative position upon either side of the standard.

The guide upon the end of the beam is provided with a slot, as shown in dotted lines, so that it can be adjusted upon the end of the beam into the desired position.

Having thus described my invention, I claim—

The combination of the reversible mold-board, the flexible connection connected to its rear end, a guide through which the connection passes, a nut or swivel to which the upper end of the connection is fastened, a hook upon which the nut or swivel is placed, the operating-lever pivoted to the plow at one end, and the catch or stop behind which the lever is made to catch, substantially as shown.

In testimony whereof I affix my signature in presence of two witnesses.

THOS. LUMSDON.

Witnesses:
M. JACKSON,
W. B. JACKSON.